(12) United States Patent
Minemura et al.

(10) Patent No.: US 10,593,323 B2
(45) Date of Patent: Mar. 17, 2020

(54) KEYWORD GENERATION APPARATUS AND KEYWORD GENERATION METHOD

(71) Applicant: TOYOTA JIDOSHA KABUSHIKI KAISHA, Toyota-shi, Aichi-ken (JP)

(72) Inventors: Takuma Minemura, Hasuda (JP); Sei Kato, Kawasaki (JP); Junichi Ito, Nagoya (JP); Youhei Wakisaka, Meguro-ku (JP); Atsushi Ikeno, Kyoto (JP); Toshifumi Nishijima, Kasugai (JP); Fuminori Kataoka, Nisshin (JP); Hiromi Tonegawa, Okazaki (JP); Norihide Umeyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 15/705,973

(22) Filed: Sep. 15, 2017

(65) Prior Publication Data

US 2018/0090133 A1 Mar. 29, 2018

(30) Foreign Application Priority Data

Sep. 29, 2016 (JP) .................................. 2016-191436

(51) Int. Cl.
*G10L 15/00* (2013.01)
*G10L 15/18* (2013.01)
(Continued)

(52) U.S. Cl.
CPC .......... *G10L 15/1815* (2013.01); *G10L 13/08* (2013.01); *G10L 15/22* (2013.01); *G10L 2015/088* (2013.01); *G10L 2015/227* (2013.01)

(58) Field of Classification Search
CPC .............................. G10L 15/265; G10L 15/30
(Continued)

(56) References Cited

U.S. PATENT DOCUMENTS

2001/0021909 A1 9/2001 Shimomura et al.
2005/0080632 A1* 4/2005 Endo .................. G10L 15/08
704/277
(Continued)

FOREIGN PATENT DOCUMENTS

JP 2001-188784 A 7/2001
JP 2004-109323 A 4/2004
(Continued)

OTHER PUBLICATIONS

Hiroshima et al. "Related Term Extraction for Keyword Input Support in Geographic Information Retrieval." The 26th Annual Conference fo teh Japanese Society for Artificial Intelligence, Jun. 15, 2012, pp. 1-2.
(Continued)

*Primary Examiner* — Daniel Abebe
(74) *Attorney, Agent, or Firm* — Oliff PLC

(57) ABSTRACT

A keyword generation apparatus, comprises a vocabulary acquisition unit that acquires a keyword uttered by a first user; a first positional information acquisition unit that acquires first positional information including information representing a location at which the first user has uttered the keyword; a storage unit that stores the first positional information and the keyword in association with each other; a second positional information acquisition unit that acquires second positional information including information representing a current position of a second user; and an extraction unit that extracts a keyword unique to a locality in which the second user is positioned from the storage unit based on the second positional information.

7 Claims, 7 Drawing Sheets

(51) Int. Cl.
*G10L 13/08* (2013.01)
*G10L 15/22* (2006.01)
*G10L 15/08* (2006.01)

(58) Field of Classification Search
USPC .......................................................... 704/243
See application file for complete search history.

(56) References Cited

U.S. PATENT DOCUMENTS

| | | | |
|---|---|---|---|
| 2010/0070456 | A1 | 3/2010 | Sugihara et al. |
| 2014/0324431 | A1* | 10/2014 | Teasley .................. G10L 15/22 704/246 |
| 2015/0106096 | A1* | 4/2015 | Toopran ................ G10L 15/193 704/244 |
| 2017/0133015 | A1* | 5/2017 | Tomsa .................... G10L 15/26 |
| 2018/0035269 | A1* | 2/2018 | Mummidi ............... H04W 4/21 |

FOREIGN PATENT DOCUMENTS

| | | |
|---|---|---|
| JP | 2009-037050 A | 2/2009 |
| JP | 2009-237755 A | 10/2009 |
| JP | 2010-072811 A | 4/2010 |
| JP | 2014-109998 A | 6/2014 |
| JP | 2015-219225 A | 12/2015 |

OTHER PUBLICATIONS

Partial Translation of Oct. 9, 2018 Office Action issued in Japanese Patent Application No. 2016-191436.

Hiroshima et al. "Related Term Extraction for Keyword Input Support in Geographic Information Retrieval." The 26th Annual Conference of the Japanese Society for Artificial Intelligence, Jun. 15, 2012, pp. 1-2.

* cited by examiner

KEYWORD DATA

| LOCALITY (HASH VALUE CORRESPONDING TO POSITIONAL INFORMATION) | KEYWORD | OCCURRENCE FREQUENCY |
|---|---|---|
| xn77512 | BIC CAMERA | 3 |
| xn77512 | TSUTAYA | 2 |
| xn77512 | SHINJUKU STATION EAST EXIT | 21 |
| xn774ch | YODOBASHI CAMERA | 8 |
| xn774ch | SHINJUKU STATION WEST EXIT | 15 |
| ... | ... | ... |

FIG. 2

(A) KEYWORD DATA

| LOCALITY (HASH VALUE CORRESPONDING TO POSITIONAL INFORMATION) | KEYWORD | MOVEMENT DIRECTION | OCCURRENCE FREQUENCY |
|---|---|---|---|
| xn774c | SHINJUKU I-LAND TOWER | WEST | 3 |
| xn774c | KEIO DEPARTMENT STORE | EAST | 2 |
| xn774c | TOKYO METROPOLITAN GOVERNMENT BUILDING | SOUTH | 21 |
| xn774c | SHINJUKU STATION | EAST | 15 |
| xn774c | SHINJUKU STATION WEST EXIT | — | 15 |
| ... | ... | ... | ... |

FIG. 5A (B) KEYWORD DATA

| LOCALITY (HASH VALUE CORRESPONDING TO POSITIONAL INFORMATION) | KEYWORD | DESTINATION | OCCURRENCE FREQUENCY |
|---|---|---|---|
| xn774c | SHINJUKU I-LAND TOWER | xn77h3 | 3 |
| xn774c | KEIO DEPARTMENT STORE | xn77h3 | 2 |
| xn774c | TOKYO METROPOLITAN GOVERNMENT BUILDING | xn77h3 | 21 |
| xn774c | SHINJUKU STATION | xn77h3 | 15 |
| xn774c | SHINJUKU STATION WEST EXIT | — | 15 |
| ... | ... | ... | ... |

FIG. 5B

KEYWORD DATA

| LOCALITY | KEYWORD | GENRE | OCCURRENCE FREQUENCY |
|---|---|---|---|
| xn7ks | KASUKABE | — | ... |
| xn7ks | SHIN-CHAN | ANIME | ... |
| xn7ks | UNDERGROUND TEMPLE | PUBLIC FACILITY | ... |
| xn7ks | LALA GARDEN | SHOPPING | ... |
| xn7ks | JUMP | GOURMET | ... |
| xn7ks | ANGEL DOME | AMUSEMENT | ... |
| ... | ... | ... | ... |

FIG. 7

KEYWORD GENERATION APPARATUS AND KEYWORD GENERATION METHOD

BACKGROUND OF THE INVENTION

Field of the Invention

The present invention relates to an apparatus that generates a keyword used in a dialogue with a user.

Description of the Related Art

Voice dialogue apparatuses that provide various kinds of information by recognizing a voice uttered by a user and engaging in a dialogue with a person are being put to practical use.

In addition, systems in which a voice dialogue apparatus spontaneously provides a user with a conversation topic are being devised. For example, Japanese Patent Application Laid-open No. 2009-037050 describes a dialogue apparatus which selects a conversation topic from a plurality of conversation topics stored in advance based on feature amounts of a voice uttered by a user and behavior of the user and which provides the user with relevant information. Furthermore, Japanese Patent Application Laid-open No. 2009-237755 describes a related term retrieval apparatus for retrieving a related term that relates to an input keyword.

SUMMARY OF THE INVENTION

The invention described in Japanese Patent Application Laid-open No. 2009-037050 has a problem in that only conversation topics determined in advance can be provided. For example, when providing a conversation topic to a user on the move, a conversation topic in accordance with a locality such as a current position or a destination of the user cannot be generated.

On the other hand, a method is conceivable in which information related to a current position or a destination of a user is input to the apparatus described in Japanese Patent Application Laid-open No. 2009-237755 and a conversation topic is generated after acquiring a keyword related to positional information. However, since the invention places emphasis on the relevance between keywords, a large number of generic words unrelated to the positional information ends up being output and a conversation topic unique to a locality cannot be provided.

A solution to this problem requires acquiring keywords unique to a locality in which a user on the move is positioned.

The present invention has been made in consideration of the problems described above and an object thereof is to provide a keyword generation apparatus that generates a keyword unique to a locality in which a user is positioned.

The present invention in its one aspect provides a keyword generation apparatus, comprising a vocabulary acquisition unit that acquires a keyword uttered by a first user; a first positional information acquisition unit that acquires first positional information including information representing a location at which the first user has uttered the keyword; a storage unit that stores the first positional information and the keyword in association with each other; a second positional information acquisition unit that acquires second positional information including information representing a current position of a second user; and an extraction unit that extracts a keyword unique to a locality in which the second user is positioned from the storage unit based on the second positional information.

The keyword generation apparatus according to the present invention acquires a keyword uttered by a first user and first positional information representing a location at which the first user has uttered the keyword, and stores the keyword and the first positional information in association with each other. The keyword may be uttered by a voice or may be uttered electronically. For example, the keyword may be a message uttered by a user terminal owned by the first user (for example, a message uttered by Messenger, e-mail, SNS, or the like).

In addition, the keyword generation apparatus according to the present invention acquires second positional information representing a current position of a second user and, based on the second positional information, extracts a matching keyword from the storage unit.

In this manner, by determining a keyword to be extracted based on the location at which the first user has uttered a keyword and a current position of the second user, a keyword unique to a locality in which the second user is positioned can be acquired and beneficial information can be provided to the second user.

Moreover, the extracted keyword may be used to provide information to the second user or may be used as supplementary data in order to provide a service to the second user. For example, the extracted keyword may be used when providing a conversation topic with a voice dialogue apparatus or may be used when performing weighting in a voice recognition process or the like.

When there is a keyword which is uttered by the first user and of which an occurrence is higher in the locality in which the second user is positioned than in another locality, the extraction unit may preferentially extract the keyword.

Favorably, when an occurrence of a keyword in a given locality is higher than in another locality or, in other words, when there is a keyword that is uttered more frequently in the given locality than in another locality, the keyword is preferentially extracted. This is because such a keyword is likely to be a keyword unique to the locality. Moreover, a locality is not limited to a specific classification method. For example, a locality may be an administrative area or may be a unit of division based on a mesh (such as a Geohash).

The keyword generation apparatus may further comprise a unit that stores data representing preferences of the second user, and the extraction unit may extract a keyword compatible with the preferences of the second user.

By storing data related to preferences of the second user, a keyword more compatible with the second user can be extracted. A preference may be a genre of a keyword or a keyword itself. Moreover, with respect to data representing the preferences of the second user, data to be preferentially extracted may be defined or data to be excluded may be defined. Alternatively, weights or the like may be defined.

The first positional information may further include information related to a movement direction of the first user, and the storage unit may further associate the movement direction with the keyword and stores the associated movement direction and keyword.

Further, the second positional information may further include information related to a movement direction of the second user, and the extraction unit may extract the keyword further based on the movement direction of the second user.

Even when positional information is the same (or substantially the same), an appropriate keyword may change depending on a movement direction. For example, when the user is moving in a direction that separates the user from a landmark, it may be better to avoid recording and extracting a name of the landmark. Therefore, favorably, storage and extraction of a keyword are performed further based on a movement direction.

Moreover, a movement direction need not necessarily be represented by an azimuth. For example, information indicating an orientation of movement relative to a landmark may be used.

The first positional information may further include information related to a destination of the first user, and the storage unit may further associate the destination with the keyword and stores the associated destination and keyword.

Further, The second positional information may further include information related to a destination of the second user, and the extraction unit may extract the keyword further based on the destination of the second user.

Even when positional information is the same (or substantially the same), an appropriate keyword may change depending on a destination. For example, a keyword to be provided may differ depending on whether a person resides in a given locality or a person is simply passing through the given locality on the way toward a destination. Therefore, favorably, storage and extraction of a keyword are performed further based on a destination.

The present invention in its another aspect provides a dialogue text generation system comprising the keyword generation apparatus and a dialogue text generation apparatus that generates a dialogue text to be provided to a user, based on a keyword acquired by the keyword generation apparatus.

An appropriate dialogue text to be provided to a user can be generated by inputting a keyword generated by the keyword generation apparatus according to the present invention into a dialogue text generation apparatus.

The present invention in its another aspect provides a keyword generation apparatus, comprising a first acquisition unit that acquires keyword data associating a keyword uttered by a first user and first positional information including information representing a location at which the first user has uttered the keyword with each other; a second acquisition unit that acquires second positional information including information representing a current position of a second user; and an extraction unit that extracts a keyword unique to a locality in which the second user is positioned from the keyword data based on the second positional information.

Moreover, the present invention can be identified as a keyword generation apparatus including at least a part of the units described above. In addition, the present invention can also be identified as a keyword generation method carried out by the keyword generation apparatus described above. The processes and units described above may be implemented in any combination thereof insofar as technical contradictions do not occur.

According to the present invention, a keyword generation apparatus that generates a keyword unique to a locality in which a user is positioned can be provided.

BRIEF DESCRIPTION OF THE DRAWINGS

FIG. 2 shows an example of keyword data used in the first embodiment;

FIGS. 5A and 5B show an example of keyword data used in a second embodiment;

FIG. 7 shows an example of keyword data used in the third embodiment.

DESCRIPTION OF THE EMBODIMENTS

First Embodiment

Hereinafter, a preferred embodiment of the present invention will be described with reference to the drawings.

A dialogue system according to the first embodiment is a system that spontaneously provides a conversation topic to a user aboard a vehicle.

<System Configuration>

Figure 1:
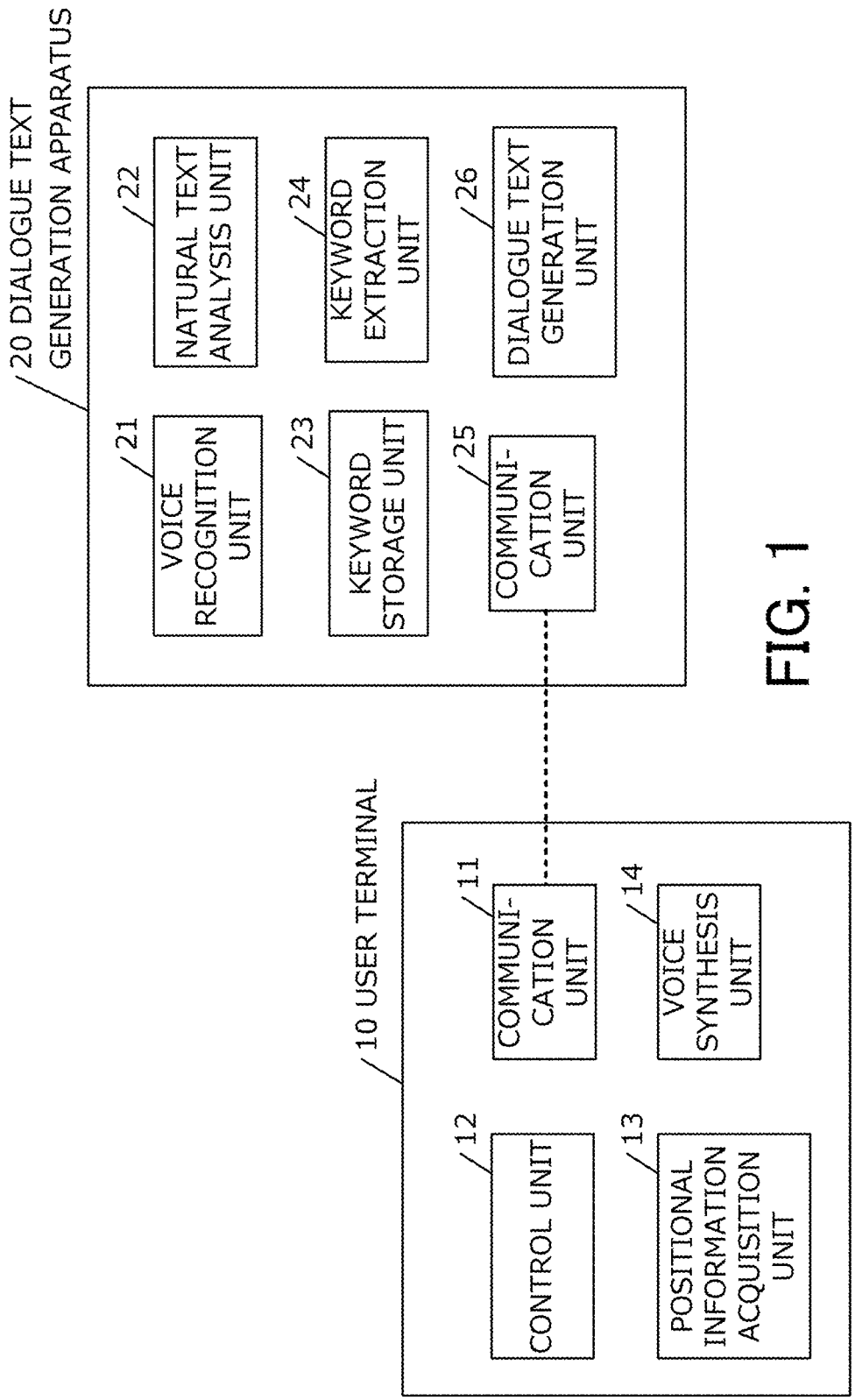
FIG. 1 is a system configuration diagram of a dialogue system according to a first embodiment.

FIG. 1 is a system configuration diagram of the dialogue system according to the first embodiment. The dialogue system according to the present embodiment is constituted by a user terminal 10 and a dialogue text generation apparatus 20.

The user terminal 10 is a computer equipped with a function for performing voice acquisition, a function for performing voice output, and a function for acquiring positional information. While the user terminal 10 is typically a mobile computer owned by the user aboard the vehicle, the user terminal 10 may instead be a computer mounted to the vehicle (for example, a car navigation apparatus).

In addition, the dialogue text generation apparatus 20 is an apparatus which accumulates data transmitted from the user terminal 10 and which generates a dialogue text when receiving a request from the user terminal 10.

Processing performed by the dialogue system according to the present embodiment is divided into two phases: a collection phase and a generation phase.

The collection phase is a phase in which the dialogue text generation apparatus 20 collects voice data and positional information from a plurality of user terminal 10 and, after extracting a keyword from the voice data, stores positional information and the keyword in association with each other.

In addition, the generation phase is a phase in which the dialogue text generation apparatus 20 acquires positional information from the user terminal 10, extracts a keyword corresponding to the positional information from stored data, and generates a dialogue text based on the extracted keyword. Moreover, the user terminal 10 that communicates in the collection phase and the user terminal 10 that communicates in the generation phase may be separate apparatuses.

The user terminal 10 is constituted by a communication unit 11, a control unit 12, a positional information acquisition unit 13, and a voice synthesis unit 14.

The communication unit 11 is a unit that communicates with the dialogue text generation apparatus 20 by accessing a network via a communication line (for example, a mobile phone network).

The control unit 12 is a unit responsible for controlling the user terminal 10. Specifically, in the collection phase, the control unit 12 performs control by acquiring voice using a microphone (not shown) and transmitting voice data to the dialogue text generation apparatus 20 together with positional information acquired by the positional information acquisition unit 13 to be described later. In addition, in the generation phase, the control unit 12 performs control by transmitting positional information to the dialogue text generation apparatus 20, acquiring a dialogue text from the dialogue text generation apparatus 20, converting the dialogue text into voice, and outputting the voice using a speaker (not shown).

The positional information acquisition unit 13 is a unit that acquires a current position (latitude and longitude) of the user terminal 10 from a GPS module (not shown) provided on the apparatus.

The voice synthesis unit 14 is a unit that converts a sentence (text) generated by the dialogue text generation apparatus 20 into voice data using an existing voice synthesizing technique. The generated voice data is provided to the user via the control unit 12.

The dialogue text generation apparatus 20 is constituted by a voice recognition unit 21, a natural text analysis unit 22, a keyword storage unit 23, a keyword extraction unit 24, a communication unit 25, and a dialogue text generation unit 26.

The voice recognition unit 21 is a unit which performs voice recognition on acquired voice data and which converts the voice data into a text. Voice recognition can be performed using knowntechniques. For example, the voice recognition unit 21 stores acoustic models and a recognition dictionary and performs voice recognition by comparing acquired voice data with an acoustic model to extract a feature and matching the extracted feature with the recognition dictionary. A text obtained as a result of the voice recognition is transmitted to the natural text analysis unit 22.

The natural text analysis unit 22 is a unit that performs morphological analysis on a text acquired as a result of voice recognition, breaks down a sentence into words, and extracts words after excluding particles, adverbs, and the like. Words extracted by the natural text analysis unit 22 are transmitted to the keyword storage unit 23 as keywords.

The keyword storage unit 23 is a unit that associates positional information transmitted from the user terminal 10 with a keyword output by the natural text analysis unit 22 and stores the associated positional information and keyword.

Positional information will now be described. In the present embodiment, the user terminal 10 transmits both acquired voice and positional information to the dialogue text generation apparatus 20. Positional information is information represented by latitude and longitude and is acquired by the keyword storage unit 23.

In the present embodiment, the keyword storage unit 23 classifies acquired positional information into localities represented by a mesh and stores a value identifying a locality together with a keyword. FIG. 2 shows an example of keyword data stored in the keyword storage unit 23. The keywords shown in FIG. 2 are those output by the natural text analysis unit 22. Meshing of positional information can be performed using known techniques such as Geohash.

Moreover, in the present specification, an area divided by a mesh will be referred to as a "locality".

The keyword storage unit 23 associates and stores an occurrence frequency with a locality and a keyword. For example, the example shown in FIG. 2 indicates that, in a locality called "xn774ch", a keyword "Shinjuku Station West Exit" has been uttered 15 times by a user.

Let us now resume the description of the dialogue text generation apparatus 20.

The keyword extraction unit 24 is a unit that extracts a keyword corresponding to positional information acquired from the user terminal 10 based on keyword data stored in the keyword storage unit 23 and on the positional information. In the present embodiment, when a locality corresponding to positional information acquired from the user terminal 10 and a locality recorded in keyword data are the same, a corresponding keyword is extracted.

Since functions of the communication unit 25 are similar to those of the communication unit 11 described earlier, a detailed description thereof will be omitted.

The dialogue text generation unit 26 is a unit that generates a response sentence to be provided to the user, based on the keyword extracted by the keyword extraction unit 24. The response sentence to be provided may be, for example, based on a dialogue scenario (a dialogue dictionary) stored in advance or based on information obtained by searching a database or the web. Known methods can be used to generate a dialogue text.

The dialogue text generated by the dialogue text generation unit 26 is transmitted in a text format to the user terminal 10 and subsequently converted into a synthesized voice and output toward the user.

<Processing Flow Chart>

Hereinafter, details of the collection phase will be described. In the collection phase, the dialogue text generation apparatus 20 collects voice data and positional information from the user terminal 10 and, based on the collected data, generates or updates keyword data.

Figure 3:
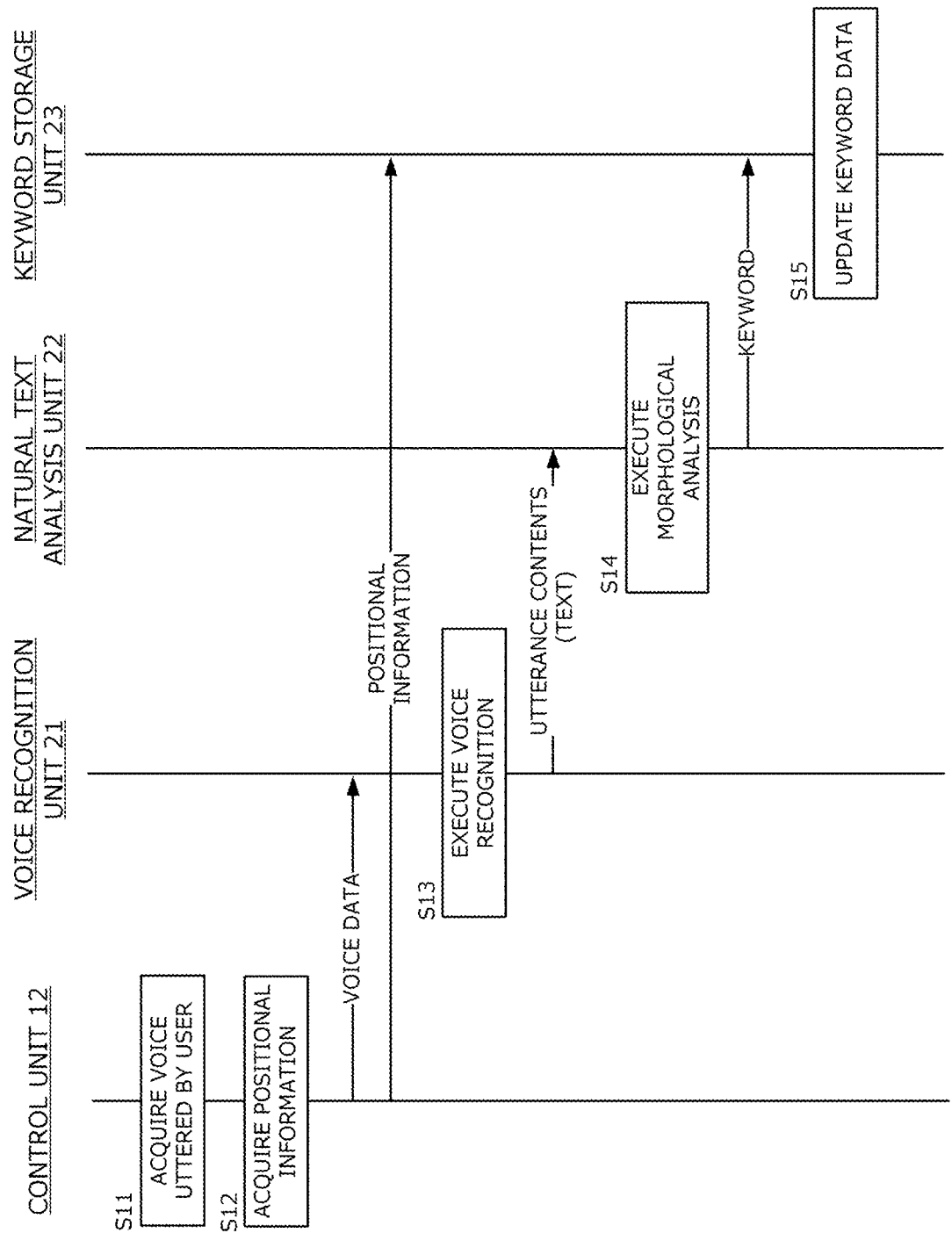
FIG. 3 is a diagram showing a data flow in the first embodiment (collection phase)

FIG. 3 is a diagram showing a data flow in the collection phase. Moreover, the processing shown in FIG. 3 is automatically started when the user utters a voice.

First, in step S11, the control unit 12 included in the user terminal 10 acquires a voice uttered by the user. The voice may be acquired by dividing the voice by a unit time or by automatically clipping a range recognized as having been uttered by the user.

Next, in step S12, the control unit 12 acquires positional information from the positional information acquisition unit 13.

The acquired voice data and positional information are respectively transmitted to the voice recognition unit 21 and the keyword storage unit 23 included in the dialogue text generation apparatus 20 in a state where the voice data and the positional information are associated with each other.

The voice data is converted into a text by the voice recognition unit 21 and, once the conversion is complete, transmitted to the natural text analysis unit (step S13). Subsequently, the natural text analysis unit 22 executes morphological analysis on the acquired text and breaks down a sentence into words (step S14). In doing so, particles, adverbs, and the like are excluded. Words extracted by the natural text analysis unit 22 are transmitted to the keyword storage unit 23 as keywords.

Next, in step S15, the keyword storage unit 23 associates positional information received from the user terminal 10 and a keyword transmitted by the natural text analysis unit 22 with each other and updates keyword data. Specifically, the positional information received from the user terminal 10 is converted into a hash value and a determination is made on whether or not a corresponding keyword exists in keyword data. As a result, when a corresponding keyword does not exist, a new record is added. In this case, an occurrence frequency is 1. On the other hand, when a corresponding keyword exists, an occurrence frequency is added (incremented).

According to the processing described above, a keyword can be extracted based on a voice uttered by the user and the extracted keyword can be accumulated in association with positional information.

Moreover, the processing described above is executed with respect to a plurality of user terminals 10. In other words, information related to keywords uttered by a plurality of users is recorded in keyword data in such a way that individuals are not identified.

Figure 4:
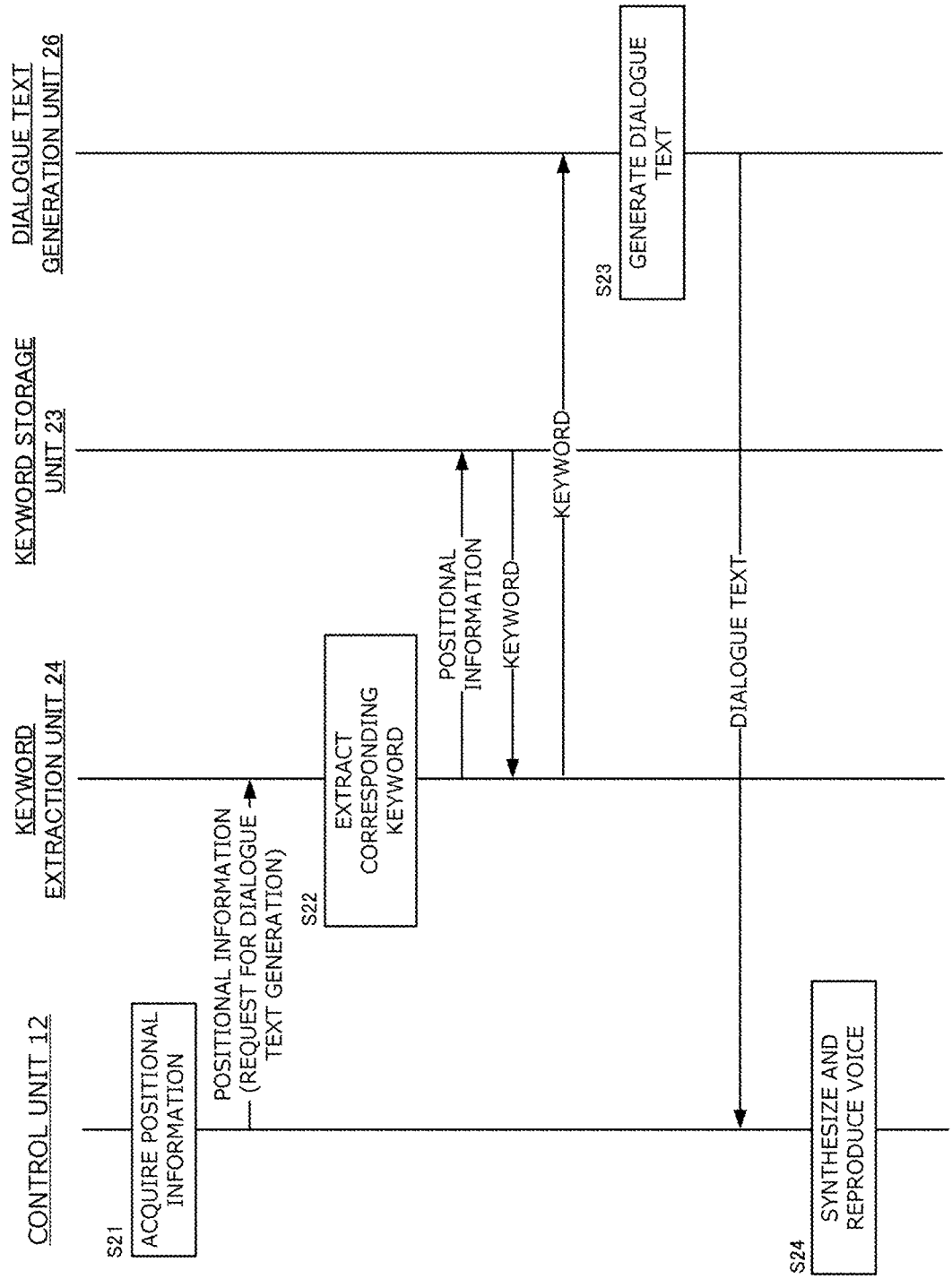
FIG. 4 is a diagram showing a data flow in the first embodiment (generation phase)

Next, details of the generation phase will be described. In the generation phase, the user terminal 10 issues a request including positional information to the dialogue text generation apparatus 20, and the dialogue text generation apparatus 20 extracts a keyword based on the positional information and generates a dialogue text using the keyword. FIG. 4 is a diagram showing a data flow in the generation phase. The processing shown in FIG. 4 is started at a timing where the user terminal 10 makes a determination to provide a dialogue text to the user.

First, in step S21, the control unit 12 acquires positional information from the positional information acquisition unit 13. The acquired positional information is transmitted to the keyword extraction unit 24 included in the dialogue text generation apparatus 20.

Next, in step S22, the keyword extraction unit 24 accesses keyword data stored in the keyword storage unit 23 and acquires a keyword corresponding to the positional information (locality). When a plurality of keywords are acquired, scoring may be performed to determine which keyword is to be adopted.

An example of a method of performing scoring will now be described.
(1) Give a high score to a keyword with a high occurrence frequency For example, a keyword with a highest occurrence frequency may be extracted from a plurality of keywords.
(2) Give a high score to a keyword with an occurrence that stands out in comparison to other localities Keyword allocated to a target locality are all extracted and, for each keyword, an occurrence α in the locality and an occurrence β for the entire nation (in other words, all records) are calculated. An occurrence refers to a ratio of an occurrence frequency of a given keyword to a sum of occurrence frequencies of all keywords.

As a result, when there is a keyword for which α is prominently larger than β, a determination can be made that the keyword is unique to the locality. In this manner, scoring may be performed based on a ratio between α and β.

It is needless to say that other scoring methods can be adopted.

The selected keyword is transmitted to the dialogue text generation unit 26 and a dialogue text is generated (step S23). The generated dialogue text is transmitted to the control unit 12 and, after being converted into voice data by the voice synthesis unit 14, the voice data is reproduced through a speaker (not shown) (step S24).

As described above, the dialogue system according to the first embodiment stores keywords uttered by a plurality of users in association with locations at which the keywords has been uttered and, when a request is made from the user terminal 10, extracts a keyword corresponding to a location and then generates a dialogue text. According to the configuration described above, a keyword unique to a locality in which a user is positioned can be extracted and a user on the move can be provided with an appropriate conversation topic.

Second Embodiment

In the first embodiment, a keyword is extracted solely based on positional information. In contrast, a second embodiment is an embodiment in which a keyword is extracted by further taking a movement direction of the user terminal 10 into consideration.

The positional information acquisition unit 13 according to the second embodiment is equipped with a function for detecting a movement direction in addition to acquiring positional information. In addition, in the second embodiment, a "movement direction" is further associated with keyword data as shown in FIG. 5A. A movement direction is used together with positional information when updating keyword data in step S15 and when extracting a keyword in step S22. In other words, a corresponding keyword is extracted when both positional information and movement directions are consistent.

According to the second embodiment, since keywords are extracted further based on movement directions, an appropriate keyword can be varied for each movement direction.

Moreover, while the four directions of north, south, east, and west have been illustrated as movement directions in the present example, movement directions are not limited thereto. For example, a movement direction may be represented by an azimuth or by a label classified according to azimuths. Alternatively, a movement direction may be represented by a travel direction independently defined for each road. In addition, a movement direction need not be real-time information. For example, a direction of a destination as viewed from an origin by a target user may be adopted as a movement direction.

Modification of Second Embodiment

While a keyword is extracted using a movement direction in the second embodiment, a keyword may be extracted using other elements.

For example, when the user terminal 10 is capable of acquiring a movement route of a user, a keyword may be extracted using information related to the movement route. For example, a destination of the user may be used in place of a movement direction. FIG. 5B shows an example in which a "destination" is further associated with keyword data.

For example, a destination of the user may be acquired from a route guidance apparatus, a car navigation apparatus, a mobile terminal owned by the user, or the like, and when a unit that estimates a destination is provided, a destination may be acquired from the unit. Alternatively, a keyword may be extracted based on whether or not the user is moving toward a destination (whether or not the user is receiving route guidance).

Third Embodiment

A third embodiment is an embodiment in which a keyword is extracted by further taking preferences of a user into consideration.

Figure 6:
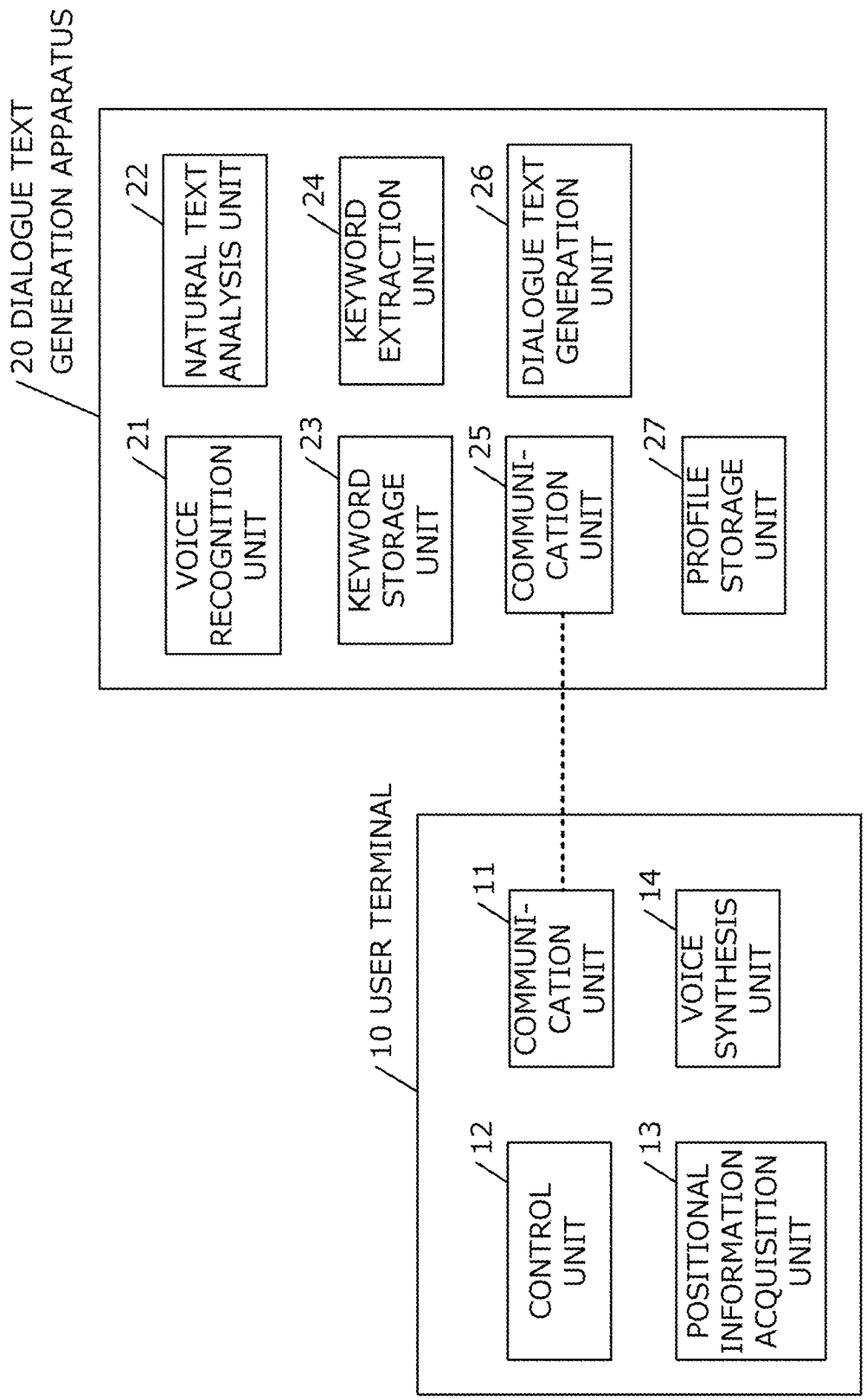
FIG. 6 is a system configuration diagram of a dialogue system according to a third embodiment.

FIG. 6 is a system configuration diagram of a dialogue system according to the third embodiment. In the third embodiment, the dialogue text generation apparatus 20 further includes a profile storage unit 27.

The profile storage unit 27 is a unit that stores a profile of a user associated with the user terminal 10. In the present embodiment, as a profile, the profile storage unit 27 stores information related to preferences in providing information for each user.

FIG. 7 shows an example of keyword data stored in the keyword storage unit 23 according to the third embodiment.

In the present embodiment, for each keyword, a label representing a genre of the keyword is added.

In addition, in the third embodiment, in step S21, the control unit 12 transmits an identifier of a user to the dialogue text generation apparatus 20 (the keyword extraction unit 24), and the keyword extraction unit 24 acquires a profile corresponding to the user and then selects a keyword to be extracted.

For example, when the profile of a target user includes a definition describing a preference for a certain genre, scoring is performed by giving a larger weight to the genre. In addition, when the profile of the target user includes a definition describing a nonpreference for a certain genre, scoring is performed by giving a smaller weight to the genre.

Moreover, while an example of changing a weight when performing scoring has been described, a keyword may be extracted using other methods.

According to the third embodiment, since a keyword compatible with preferences of a user can be selected, usability is further improved.

Modifications

The embodiments described above merely represent examples and the present invention can be implemented with various modifications without departing from the spirit and scope of the invention.

For example, although a keyword is generated based on a voice uttered by a user in the description of the embodiments, keywords in forms other than voice may be collected as long as the keywords are uttered by a user. For example, messages transmitted by a mobile terminal owned by the user may be collected instead of voice.

In addition, while a dialogue text is generated based on an extracted keyword in the description of the embodiments, an extracted keyword may be used for purposes other than the generation of a dialogue text. For example, a voice recognition apparatus may be provided with an extracted keyword and the voice recognition apparatus may perform voice recognition after giving a larger weight to the acquired keyword. In this manner, a keyword can also be used as supplementary data for providing a service to the user.

Furthermore, while an area divided by a mesh is adopted as a locality in the description of the embodiments, meshing need not necessarily be performed. For example, the inside of a prescribed shape (for example, a circle) centered on acquired coordinates may be handled as a single locality. Alternatively, referring to map data, coordinates may be classified into localities (for example, municipalities).

In addition, while the natural text analysis unit 22 excludes particles and adverbs in the description of the embodiments, the natural text analysis unit 22 may be configured to only extract nouns (or proper nouns).

Furthermore, while keyword data is shared by all users in the description of the embodiments, different keyword data may be used for each user. According to the configuration described above, since a keyword is extracted based on a conversation having been previously carried out between a driver and a passenger or the like, a more personalized conversation topic can be provided.

What is claimed is:

1. A keyword generation apparatus for use with a vehicle navigation system, comprising:
   a vocabulary acquisition unit that acquires a keyword uttered by a first user;
   a first information acquisition unit that acquires first information including (1) information representing a first location at which the first user has uttered the keyword and (2) information related to at least one of the first user's movement direction or destination;
   a storage unit that stores the first information and the keyword in association with each other;
   a second information acquisition unit that acquires second information from the vehicle navigation system, the second information including (1) information representing a current position of a second user and (2) information related to at least one of the second user's movement direction or destination; and
   an extraction unit that extracts a keyword unique to a locality in which the second user is positioned and corresponding to the second user's movement direction or destination from the storage unit based on the second information.

2. The keyword generation apparatus according to claim 1, wherein
   when there is a keyword which is uttered by the first user and of which an occurrence is higher in the locality in which the second user is positioned than in another locality, the extraction unit preferentially extracts the keyword.

3. The keyword generation apparatus according to claim 1, further comprising a unit that stores data representing preferences of the second user, wherein
   the extraction unit extracts a keyword compatible with the preferences of the second user.

4. The keyword generation apparatus according to claim 1, wherein
   the first information further includes information related to a movement direction of the first user, and
   the storage unit further associates the movement direction with the keyword and stores the associated movement direction and keyword.

5. The keyword generation apparatus according to claim 1, wherein
   the first information further includes information related to a destination of the first user, and
   the storage unit further associates the destination with the keyword and stores the associated destination and keyword.

6. A dialogue text generation system, comprising:
   the keyword generation apparatus according to claim 1; and
   a dialogue text generation apparatus that generates a dialogue text to be provided to a user, based on a keyword acquired by the keyword generation apparatus.

7. The keyword generation apparatus according to claim 1, wherein the keyword is extracted as a result of the keyword generation apparatus determining whether or not the user is moving toward the destination.

* * * * *